(12) United States Patent
Chindapol et al.

(10) Patent No.: US 8,107,408 B2
(45) Date of Patent: Jan. 31, 2012

(54) ROUTE MAINTENANCE AND UPDATE BASED ON CONNECTION IDENTIFIER IN MULTI-HOP RELAY SYSTEMS

(75) Inventors: Aik Chindapol, Washington, DC (US); Junjik Bae, Evanston, IL (US); Michael Behrendt, Nuremberg (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 875 days.

(21) Appl. No.: 11/835,604

(22) Filed: Aug. 8, 2007

(65) Prior Publication Data
US 2008/0130549 A1 Jun. 5, 2008

Related U.S. Application Data

(60) Provisional application No. 60/836,595, filed on Aug. 9, 2006.

(51) Int. Cl.
*H04B 7/14* (2006.01)
(52) U.S. Cl. .......................... 370/315; 370/322; 455/428
(58) Field of Classification Search ........................ None
See application file for complete search history.

(56) References Cited

U.S. PATENT DOCUMENTS

| | | | | |
|---|---|---|---|---|
| 7,428,227 B2* | 9/2008 | Park et al. | ...................... | 370/331 |
| 7,769,399 B2* | 8/2010 | Lee et al. | ...................... | 455/466 |
| 2002/0031103 A1* | 3/2002 | Wiedeman et al. | ........... | 370/316 |
| 2004/0169583 A1* | 9/2004 | Meier | .......................... | 340/5.31 |
| 2005/0201269 A1* | 9/2005 | Shim et al. | ..................... | 370/208 |
| 2005/0265270 A1* | 12/2005 | Yamato | ......................... | 370/310 |
| 2005/0265360 A1 | 12/2005 | Kim et al. | | |
| 2005/0271034 A1 | 12/2005 | Asokan et al. | | |
| 2007/0072604 A1* | 3/2007 | Wang | ............................ | 455/428 |
| 2007/0097971 A1* | 5/2007 | Jang et al. | ..................... | 370/390 |
| 2007/0165587 A1* | 7/2007 | Choi | ............................. | 370/338 |
| 2008/0026750 A1* | 1/2008 | Harris et al. | ............... | 455/435.1 |
| 2009/0010179 A1* | 1/2009 | Laroia et al. | ................. | 370/254 |

FOREIGN PATENT DOCUMENTS

EP 1686729 8/2006
EP 1686729 A1 * 8/2006

OTHER PUBLICATIONS

International Search Report.

* cited by examiner

*Primary Examiner* — Chi Pham
*Assistant Examiner* — Kouroush Mohebbi
(74) *Attorney, Agent, or Firm* — Brake Hughes Bellermann LLP

(57) ABSTRACT

Connection ID (CID) assignment in multi-hop relay system can be used to perform routing. Using CID assignment as routing information in a multi-hop wireless relay system to maintain the routing structure is disclosed. In a CID cache scheme, a base station builds a CID cache based on the upstream packet and broadcasts the CID cache to a relay station. The CID cache comprises CIDs along with routing information. Based on CID cache the spanning tree of the routing can be reconstructed. A hierarchical CID assignment is disclosed wherein a base station assigns a range of CIDs to a relay station. A relay station can recognize its data packets and forward them to corresponding mobile stations. Maintaining routing automatically along with CID assignment is also disclosed.

17 Claims, 5 Drawing Sheets

ROUTE MAINTENANCE AND UPDATE BASED ON CONNECTION IDENTIFIER IN MULTI-HOP RELAY SYSTEMS

CROSS-REFERENCE TO RELATED APPLICATIONS

This application claims the benefit of U.S. Provisional Application No. 60/836,595 filed Aug. 9, 2006, which is incorporated herein by reference.

BACKGROUND OF THE INVENTION

The present invention relates to multi-hop routing in a wireless network. More specifically it relates to using connection identifier assignment as routing information.

In a centralized multi-hop relay system, the routing for each mobile station (MS) is decided by the base station (BS) before transmitting the data packets based on a number of factors such as measured channel qualities, Quality-of-Service (QoS) of each connection, etc. These routing decisions should be provided to relay stations (RS) within a cell so that each RS detects and forwards the appropriate packets. In wireless mobile network, new MSs enter the network, existing mobile stations move from one place to another, and the channels between stations change rapidly. Therefore, not only creating the routing structure but also maintaining it is quite challenging.

Accordingly new methods and systems for creating and maintaining a routing structure in a wireless network are required.

SUMMARY OF THE INVENTION

One aspect of the present invention presents novel methods and systems for multi-hop routing in a wireless network using CIDs that will provide easier creation and maintenance of routing structures.

In accordance with one aspect of the present invention, a method for route maintenance in a wireless network having at least a base station (BS), a relay station (RS) and a mobile station (MS) is provided. The method includes the steps of identifying each connection between the BS and the a station within the BS's network with a unique but changeable connection identifier and inserting connection identifiers in transmission packets, creating a cache of connection identifiers and routing information, transmitting the cache to the RS, receiving the packets at the RS and detecting and forwarding the packets in accordance with the cache.

The cache can be created by the BS.

In accordance with another aspect of the invention, a time-out can be set when the cache is entered during a downlink. Additionally, the time-out can be reset when a packet is transmitted uplink. After the time-out expires, the content of the cache can be deleted.

In accordance with other aspects of the present invention, a method for route maintenance in a wireless network having at least a base station (BS), a plurality of relay stations (RS) assigns a first set of hierarchical Connections IDs (CID) to a first RS connected to the BS and assigns a subset of the first set of CIDs to a second RS that is connected to the first RS.

The method can also include assigning a second non-overlapping subset of the first set of CIDs to a third RS that is connected to the first RS. The method can further include assigning a second non-overlapping set of CIDs to a third RS connected to the BS and assigning a first subset of the second set of CIDs to a fourth RS that is connected to the third RS.

The method can further include assigning a second non-overlapping subset of the second set of CIDs to a fifth RS that is connected to the fourth RS.

In accordance with another aspect of the present invention, the method can also include detecting a packet by one of the RSs based on a content of a CID in the packet, and forwarding the packet by the RS to a station based on the content of the CID in the packet.

A system for route maintenance in a wireless network having at least a base station (BS), a relay station (RS) and a mobile station (MS), the system can also be provided by the present invention. The system includes a processor and a memory in communications with the processor, the memory including program code executable by the processor.

The system can perform the following steps: creating a cache of connection identifiers and routing information, transmitting the cache to the RS, receiving the packets at the relay station and detecting and forwarding the packets in accordance with the cache.

The system can also perform the following steps: assigning connection identifiers to all stations in a systematic way according to the method presented in this invention, receiving the packets at the relay station and detecting and forwarding the packets in accordance to the routing information embedded in the connection identifier assignment.

The system can also operate to assign a first set of hierarchical Connections IDs (CID) to a first RS connected to the BS and to assign a subset of the first set of CIDs to a second RS that is connected to the first RS.

In accordance with a further aspect of the present invention, system and methods are provided for route maintenance in a wireless network having at least a base station and a plurality of relay stations, wherein a first set of unique dynamic identifiers is assigned to a first relay station connected to the base station and a subset of the first set of unique dynamic identifiers is assigned in a hierarchical manner to a second relay station that is connected to the first relay station. The systems and methods can also assign a second exclusive subset of the first set of unique dynamic identifiers to a third relay station that is connected to the first RS. They can also assign a second set of exclusive unique dynamic identifiers to a third relay station connected to the base station and assign a first subset of the second set of unique dynamic identifiers to a fourth relay station that is connected to the third relay station. They can also assign a second subset of the second set of exclusive unique dynamic identifiers to a fifth relay station that is connected to the fourth relay station.

These methods and systems can also detect a packet at one of the relay stations based on a content of an unique identifier in the packet and then forward the detected packet to another one of the relay stations based on the content of the identifier in the packet. They can also forward the packet to the another one of the relay stations when the content of the identifier in the packet matches with the assigned values for the one of the relay stations and discarding the packet when there is no match.

These methods and systems can also change the unique identifier of the one of the relay stations upon connection to the another one of the relay stations to be an exclusive subset of the identifiers assigned to the station and then remove the assignment of unique identifiers from the one of the relay stations to which the another one of the relay stations is no longer connected.

DESCRIPTION OF A PREFERRED EMBODIMENT

Figure 1:
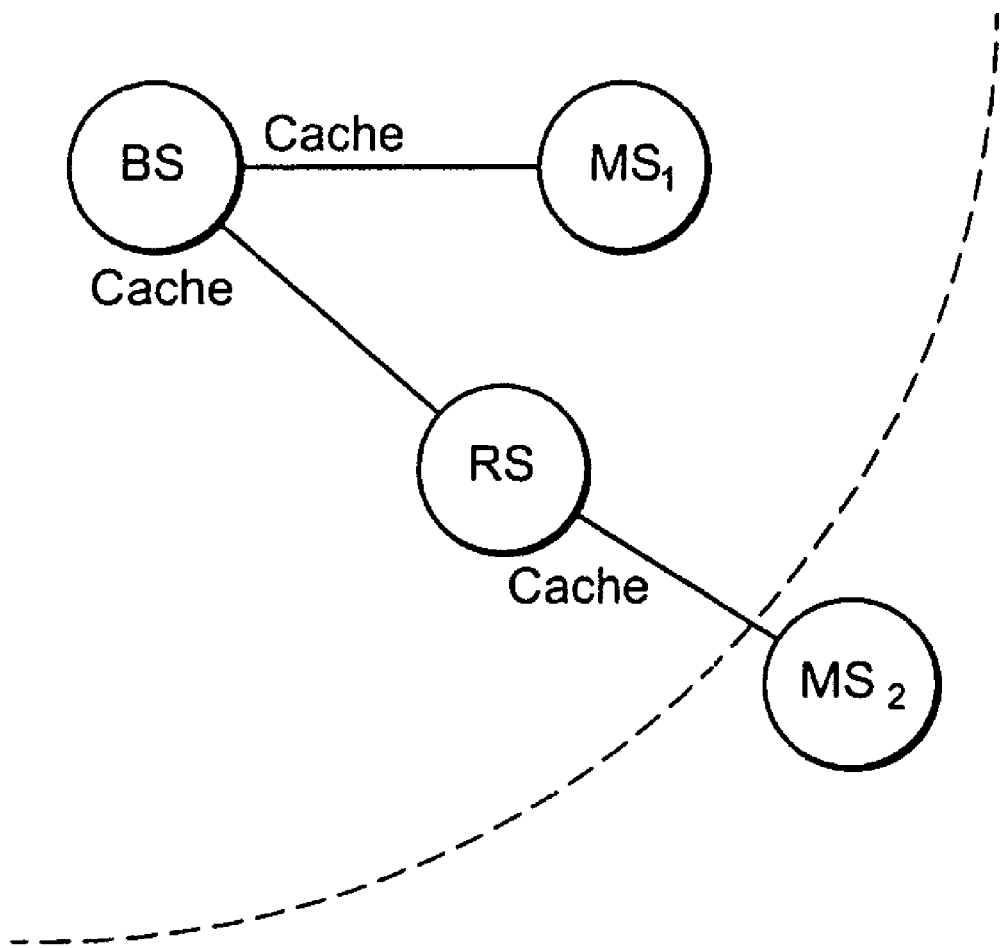
FIG. 1 is a diagram of a wireless system in accordance with one aspect of the present invention.

In a wireless network a unidirectional connection between the base station (BS) and mobile station (MS) or between BS and relay station (RS) is established for different flows of traffic, and each connection is identified by a connection identifier such as a connection ID (CID) used in IEEE 802.16. There could be more than one connection per station but each connection needs to have a unique but changeable CID. Details can be found in IEEE Std 802.16, IEEE Standard for Local and metropolitan area networks, Part 16: Air Interface for Fixed Broadband Wireless Access Systems, 2004 and in IEEE Std 802.16e, IEEE Standard for Local and metropolitan area networks, Part 16: Air Interface for Fixed and Mobile Broadband Wireless Access System, 2005. The CID for each connection is inserted within the MAC header of a packet. When a relay station receives the packet, first it checks whether the CID of the packet is for itself. If it is, a relay station accepts the packet and does the process of the present invention. Otherwise, a relay station ignores it and does nothing.

A station can distinguish the received packets by examining the CID in the MAC header and this can be used to maintain the routing structure. The forwarding functionality is only available at a relay station. Both BS and MS can only transmit and receive packets. The routing decision is done at the BS or designated RS. As different aspects of the present invention, two methods will be provided which use CID assignment as routing information: CID cache and Hierarchical CID assignment. By combining CIDs with the routing for each connection, the routing structure can be updated and maintained easily along with CIDs and the overall overheads can be reduced.

The first method here provided as an aspect of the present invention comprises to maintain and broadcast CID caches at BS. After receiving the upstream packet, BS builds CID caches which contain the routing with CIDs for each connection. By informing the whole or subset of the CID caches to each RS, the spanning tree of the routing can be reconstructed and the routing can be done accordingly. This scheme requires the active maintenance of the CID caches.

The second method here provided as an aspect of the present invention comprises a hierarchical CID assignment and does not require maintaining the CID caches. A BS assigns a set of CIDs to each RS, and each RS only detects and forwards the packets of which CIDs are within its set. The handover within a cell or reconfiguration of routing due to events such as load balancing or changes in priorities of connections in this hierarchical CID assignment scheme is also carried simply by changing a station's CID to a CID within a new station's set of CIDs.

Methods and System Description.

In IEEE 802.16, connections are identified by a 16-bit CID, as detailed in IEEE Std 802.16, IEEE Standard for Local and metropolitan area networks, Part 16: Air Interface for Fixed Broadband Wireless Access Systems, 2004. At station initialization, two pairs of management connections (basic connection and primary management connection) are established between MS and BS either directly or through a RS. The basic connection is for short, time-urgent MAC management messages and the primary management connection is for longer, more delay tolerant MAC management messages. In addition, transport connections for down-link and up-link are established to transfer the specific data flows. The assignment of CID is unique for each connection; however, it can be changed as needed.

Once the connections are established, each station can either accept or ignore the incoming packets by examining the CIDs in the MAC header. The ability to distinguish the packets with CIDs can be exploited for maintaining the routing structure in a multi-hop relay system.

CID Caches.

The idea of maintaining CID caches at BS and RS resembles that of the routing table in wired lines. Based on the upstream data packet, a BS creates a CID cache and broadcasts it to each RS in the cell. This CID cache comprises the routing decisions that a BS makes, and each RS detects and forwards the packets according to the CID cache.

FIG. 1 and Tables 1 and 2 explain the CID cache idea with a simple example. In FIG. 1, $MS_1$ is connected to BS directly and the CID assigned by BS is 7. $MS_2$ is, on the other hand, connected to BS through RS and BS assigns two CIDs, 23 for the connection between BS and RS and 42 for the connection between RS and $MS_2$. Combining the routing decision, BS constructs the CID cache such as in the table 2. Once a RS receives the CID cache from BS, then a RS knows which packets it should detect and forward.

The following Table 1 provides an example of CIDs which are assigned by a BS for each connection.

TABLE 1

| Station | CID Terminated at this Station |
|---|---|
| $MS_1$ | 7 |
| RS | 23 |
| $MS_2$ | 42 |

The following Table 2 provides an example of a CID Cache that the BS constructs with the routine decision.

TABLE 2

| Station | Down-link to | Cache Content |
|---|---|---|
| BS | $MS_1$ | 7 |
| BS | RS | 23, 42 |
| RS | $MS_2$ | 42 |

The creation and maintenance of CID caches are quite challenging in a wireless environment. New MSs enter the network, existing MSs in the network move around, and the channel gains between stations change. Therefore, the routing information in CID cache should be also updated correspondingly. To create the CID cache element, BS uses upstream CIDs. Once a BS receives the packet, the BS knows from which station the packet is originated and what path has been used. From these, BS constructs the CID cache for the down-link. However, there are situations described in IEEE Std 802.16e, IEEE Standard for Local and metropolitan area networks, Part 16: Air Interface for Fixed and Mobile Broadband Wireless Access System, 2005, wherein the down-link packet transmission happens before the upstream packet transmission. For example, an "open new connection" request (DSA-REQ) can be transmitted from a BS to a MS. In that case, a BS does not have accurate information for CID construction and a RS works like a no-fills relay as described in for instance R. Penman, *Bridges, Routers, Switches, and Internetworking Protocols*, Interconnection Second Edition, Addison-Wesley Professional Computing Series, 1999.

Every time when the routing has been changed, the CID cache should be updated. Otherwise packets would be routed to the old RS because of outdated CID cache information and would be lost. This problem can be solved by applying a relative short timeout to every entry of the CID cache inside the down-link. The timeout is reset when a packet is transmitted in the upstream and the CID cache entry is deleted when the timeout expires. Therefore, the CID cache will clean up itself and will not contain any outdated information.

Hierarchical CID Assignment

Figure 2:
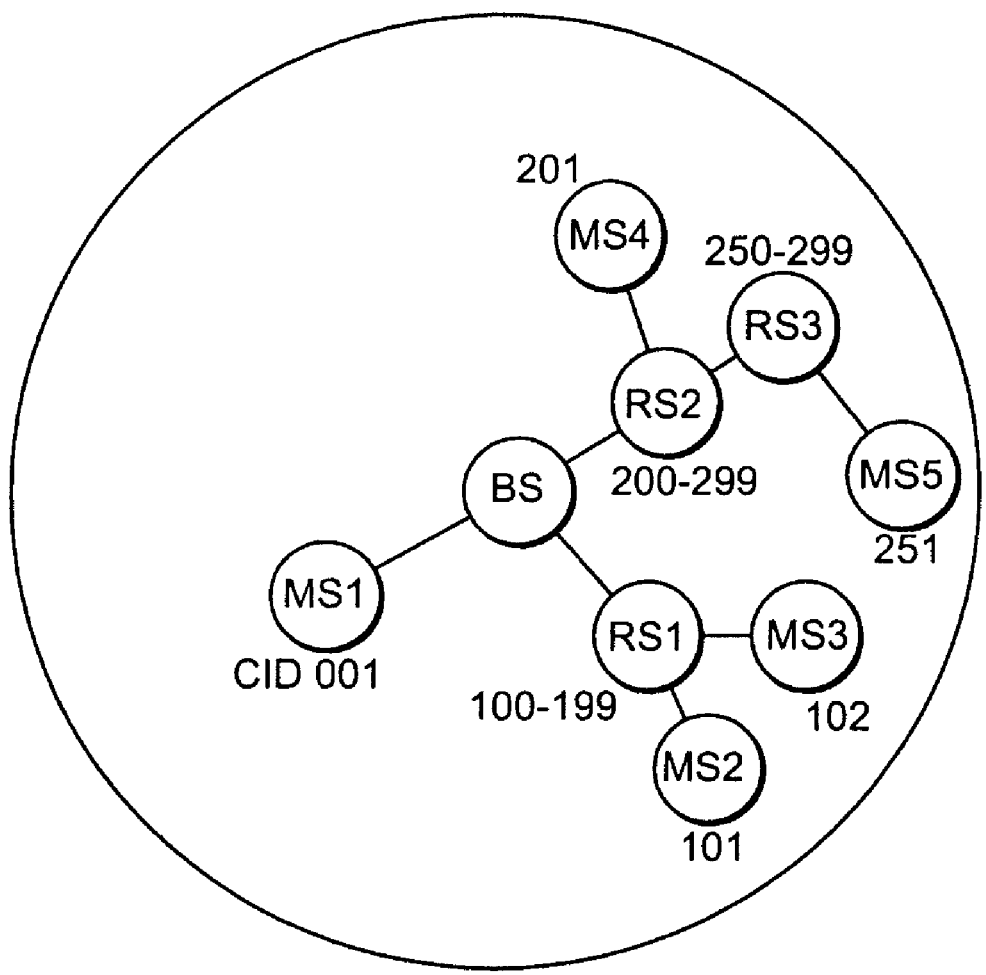
FIG. 2 is a diagram of a wireless system in accordance with another aspect of the present invention.

As a further aspect of the present invention a method is provided allowing a BS to assign a set of hierarchical connection IDs (CIDs) to each RS so that the maintenance of CI cache is eliminated. A set of hierarchical CID being assigned may be contiguous but this is not required. The following example illustrates the method of the hierarchical CID assignment. As shown in FIG. 2, CIDs of 100-199 are assigned to RS1 and CIDs of 200-299 are assigned to RS2. In addition, RS3 which is connected to a BS through RS2 is assigned to a range of CIDs which are within RS2's CID range, for example, CIDs of 250-299. When there is a downlink data transmission, both RS1 and RS2 automatically know whether the transmission is meant for itself (and corresponding nodes below it). In particular, when RS1 detects a packet with CID 102, it decodes and forwards the message to MS2. RS2, meanwhile, ignores this transmission because the CID 102 does not belong to its CID range 200-299. Similarly, when RS2 detects a packet with CID 251, it forwards the packet to a next hop station. Then, RS3 is able to detect it with CID 251 from RS2 and repeats the same procedure. Finally the data with CI) 251 is received by MS5. The up-link transmission from each station can be delivered to BS through a RS in a similar way.

The hierarchical CID assignment here provided as a further aspect of the present invention reduces the complexity related to CID caching. Once the routing decision is made by a BS, the CIDs of a station are assigned according to the way described above. Then each RS only listens and forwards the packets with CIDs which are within its CID set and ignores them otherwise. This removes the necessity to maintain and broadcast CID cache information. In addition, the handover of a moving station from one anchor station to another station within a cell can be handled easily. For example, if MS3 moves close to RS2 and the BS decides to serve MS3 through RS2, then BS changes MS3's CID from 102 to for instance 202. Then RS2 knows automatically that it should detect and decode the packets for MS3. This handover or route reconfiguration within a cell is done transparently to a MS. In other words, a station only has to know that a BS changes its assigned CID and does not have to know the routing path has been changed.

Traditionally this technique as here disclosed as an aspect of the present invention can not be applied to source-address-based routing (i.e., MAC address routing) because the connection is identified by a fixed address. However, with advance broadband wireless technology such as IEEE 802.16 such as described in IEEE Std 802.16, IEEE Standard for Local and metropolitan area networks, Part 16: Air Interface for Fixed Broadband Wireless Access Systems, 2004, and IEEE Std 802.16e, IEEE Standard for Local and metropolitan area networks, Part 16: Air Interface for Fixed and Mobile Broadband Wireless Access System, 2005, connections are identified by CIDs and can be dynamically changed by a BS. In addition, this method allows a BS to update the CID range of a RS regularly without much overhead to enhance flexibility depending on network topology and real time traffic.

In conclusion, the assignment of CIDs are exploited to maintain the routing structure and to reduce the overhead in a multi-hop relay system. Similar to the routing table in wired line, the CID caches are constructed and maintained by the BS. The BS informs each RS which CIDs it should monitor by broadcasting the CID caches. Once the CID caches are known to every station, the routing structure decided by BS can be realized. Even though the CID cache makes it easy for each station to do the routing correspondingly, BS must maintain and update the CID caches dynamically according to the routing update. The hierarchical CID assignment scheme here provided in accordance with an aspect of the present invention eliminates this maintenance of the CID cache.

In a hierarchical CID assignment, the assigned CID is related to the routing path. The BS assigns a set of CIDs to each RS and chooses one CID for a MS within the set of a RS if the packets of the MS are relayed through the RS within the range. However it is possible to allow the last RS, to which the target MS is connected, to simply forward data to the target MS in the same manner as a conventional single hop system. Therefore, the base station in this case needs not to assign CID of this MS in a hierarchical manner; however, all other relay stations involved need to have their CID sets assigned hierarchically. By hierarchically assigning the CIDs, the BS and a RS do not need to maintain the CID caches. Each RS knows which packet should be detected and forwarded by examining the CID in the packet header. In addition, the handover within a cell or reconfiguration of routing due to events such as load balancing or changes in priorities of connections can be handled easily by changing a CID of the connection.

Since there could be multiple CIDs such as those for management and data traffic with different level of quality of service connections assigned to each station in order to accommodate various priorities of connections, a communication between the base station to its child station may be routed through different paths by overlaying multiple trees of CIDs. The base station chooses a particular connection (and its corresponding path) to communicate with its child station and vice versa.

The methods which are provided herein as different aspects of the present invention can be implemented in wireless communication systems. Accordingly a wireless communication systems having at least one BS, one RS and one MS and applying at least one of the methods of the present invention is fully contemplated. Such a system may apply a CID Cache which has to be maintained by the BS. Such a system may also apply a hierarchical CID assignment.

Figure 3:
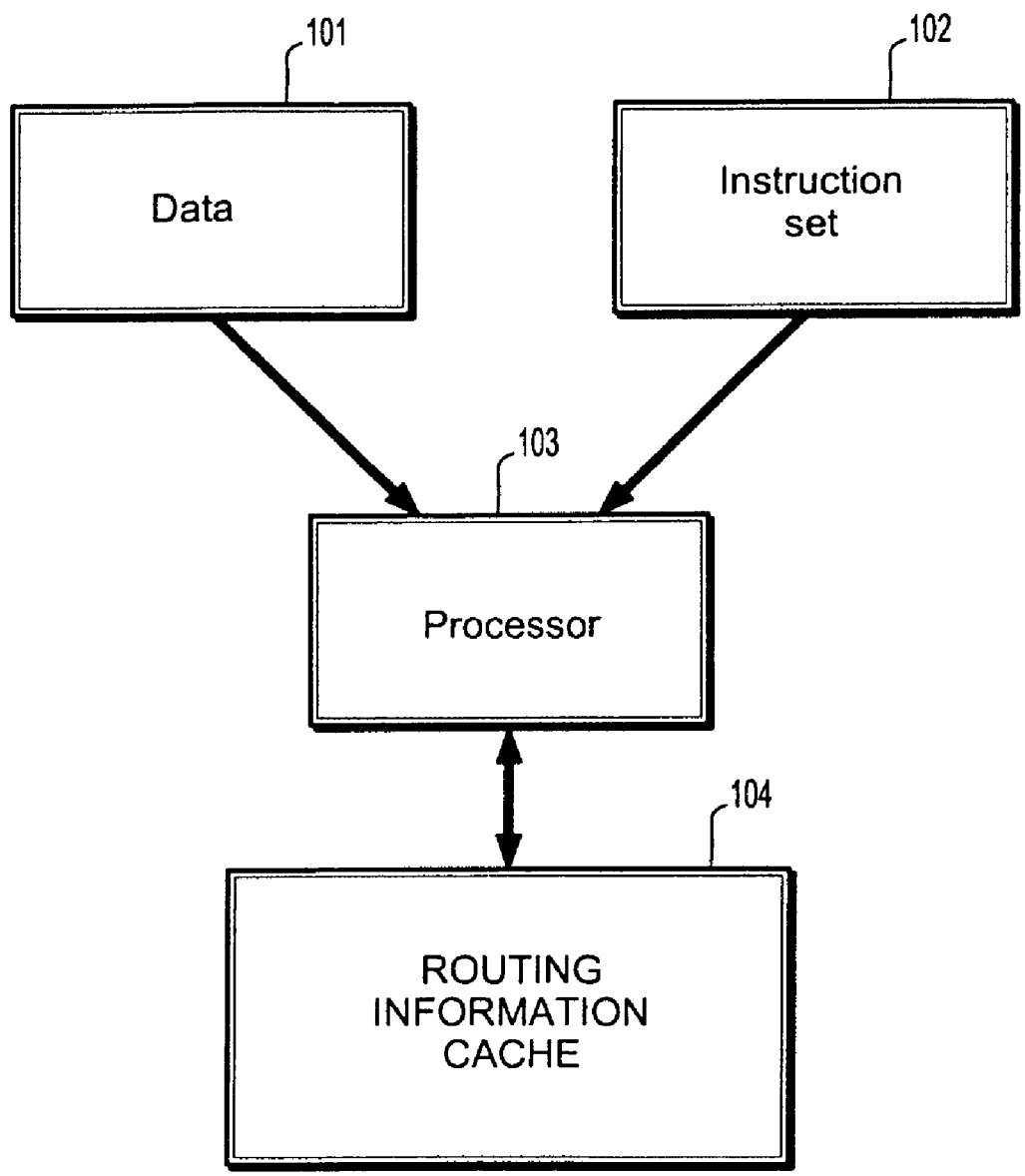
FIG. 3 illustrates a system in accordance with one aspect of the present invention.

A system which implements a method as provided as an aspect of the present invention can do so in several ways and is illustrated in FIG. 3. A system may have one of several means to implement a step of a method. In a first embodiment the system may comprise a processor 103 with a memory which implements a step of a method by executing a single instruction or a set of instructions 102 stored in a memory. Data, such as CID information or a set of CID information 101, is provided to the processor 103. In a second embodiment the means for implementing a step of a method may also comprise a customized electronic circuit which usually is a digital circuit that can execute a single or a plurality of steps of a method. In a third embodiment such means may be a customizable digital electronic circuit. Other embodiments may also be possible.

Illustrating example of hierarchical connection identifier assignment in IEEE 802.16

In a single-hop IEEE 802.16e, each connection (both management and data) is identified by a Connection ID (CID). There is no routing required; data is transmitted solely between the BS and the MS. In a multi-hop relay system, all stations form a tree topology with the BS as the root node. The routing from the BS to each MS is decided by the BS. It is possible for a RS designated by the BS to determine the routing from itself or its subordinate station to another station within its control. A different routing path is possible based on the network topology, QoS of each connection, fairness, etc.

The hierarchical CID assignment in a multi-hop relay system can be used as a means to indicate network topology and further help the BS to perform routing path selection. In this scheme, each relay station is assigned a range of CIDs for which the relay is responsible for decoding and forwarding. The parent node will control a superset of this CID range, and any child nodes (both RS and MS) will be assigned disjoint subsets of the CID range. Because of the structure of this CID assignment, the relay path could compute the relay path simply based on CIDs of destination station and each relay station can recognize its packets and forward them to corresponding stations. In this way, the routing can be maintained automatically along with CID assignment and thus significantly decrease complexity, signal overhead, and path setup latency.

A unidirectional connection between the BS and a station (MS or RS) is established for flow traffic, and each connection is identified by a connection identifier (CID). The CID for each connection is inserted within the MAC header of a packet. When it is received, first each station checks whether the CID of the packet is for itself or for its subordinate stations. Each station accepts the packet and does the process if the packet is intended to itself or its subordinate station. Otherwise, it ignores the packet and does nothing.

Additionally each station can distinguish the received packets by examining the CID in the MAC header or in the MAP-IE, and this can be used to maintain the routing structure. By combining CIDs with the routing for each connection, the routing structure can be updated and maintained easily along with CIDs.

The network topology may change from time to time. Generally the BS updates the CID list for each RS to reflect the topology changes.

Figure 4:
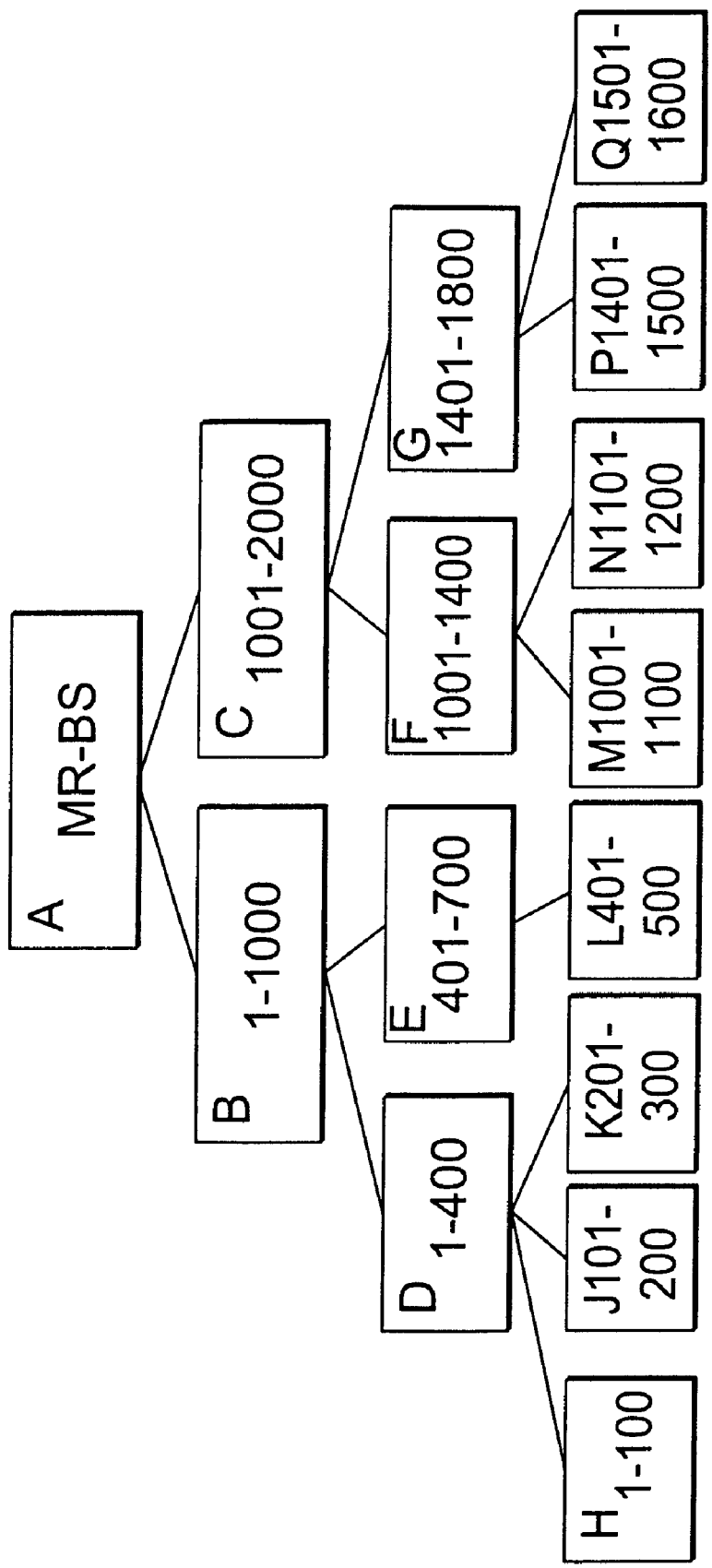
FIG. 4 illustrates systematic CID assignment using contiguous blocks in accordance with one aspect of the present invention.

FIG. 4 shows how the hierarchical CID with contiguous integer set can be allocated. The root node A represent the set of all possible CIDs. Each of its children (1st tier nodes) are assigned a contiguous range of CIDs and pairwise disjoint. For a particular 1st tier node, its children (2nd tier nodes) are each assigned a contiguous subset of the assigned range of CIDs and pairwise disjoint. This process continues for the entire tree.

In FIG. 4, a systemic CID assignment using contiguous blocks is shown. The choice of range length as multiples of 100 is arbitrary. Thus, the terminal integers for nodes B, C, D can be set to 1000, 2000, and 400 respectively. Allowing multiple terminal integers per intermediary node is possible and trivial.

Figure 5:
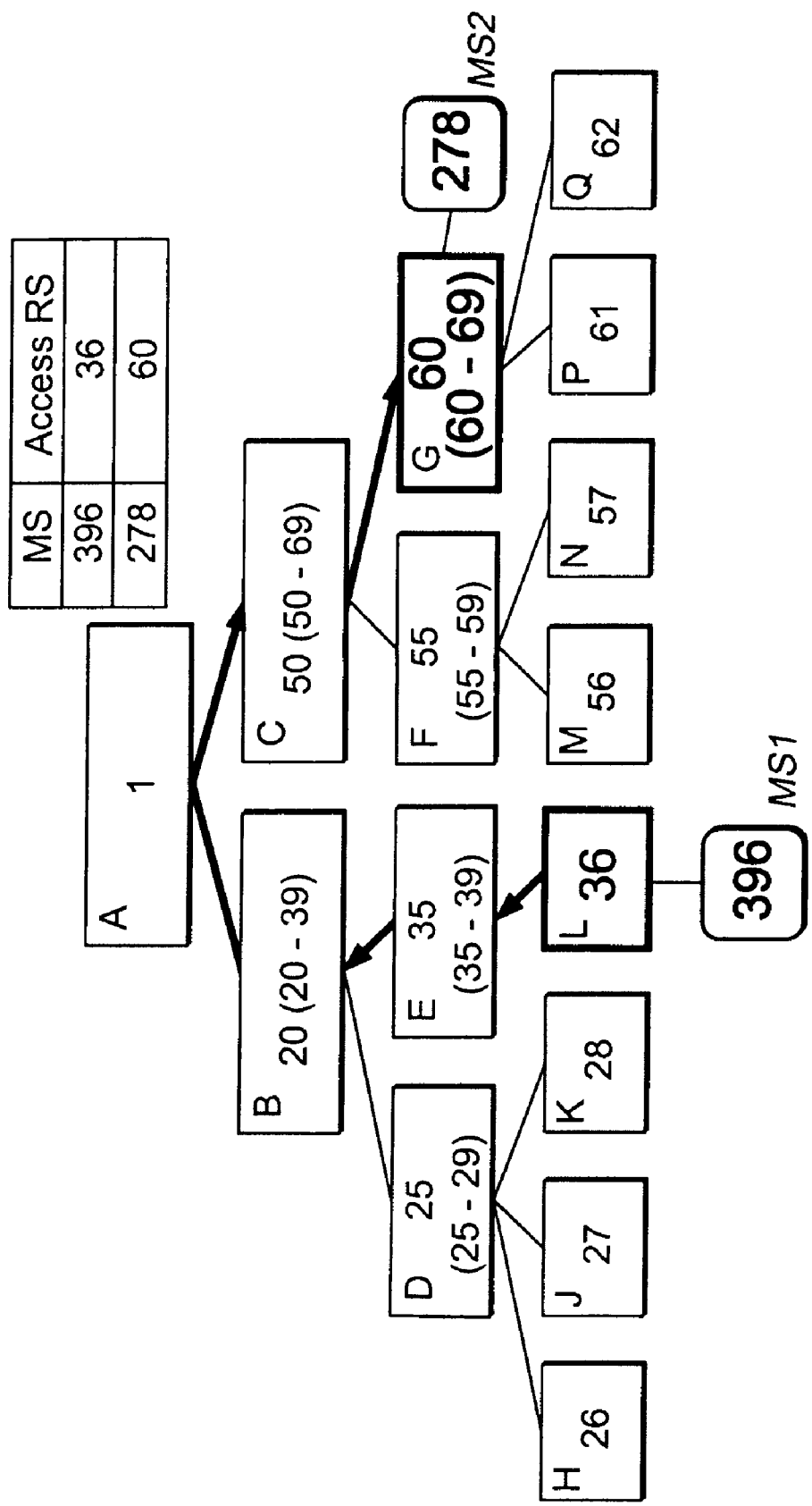
FIG. 5 illustrates a further example of relay path configuration using hierarchical CID assignment with contiguous integer partitioning in accordance with an aspect of the present invention.

FIG. 5 shows an example of relay path configuration using hierarchical CID assignment with contiguous integer partitioning. The number in parenthesis is the range of CIDs that the super-ordinate station could allocate to the subordinate RS. As shown in FIG. 5, the BS keeps records of the last RS to which each MS connects. This last RS is also called access RS. For instance, for data directed towards MS2, the MR-BS sends the data to the access RS with CID 60. Since this CID belongs to the range of CID of the RS C, it forwards the data to the RS G. Meanwhile, the RS B ignores this data as the CID is not within its range. The similar procedure can be done on the uplink. Since the access RS with CID 60 is the last RS before reaching the target MS, no further routing information is needed as the last access RS can simply forward data to the target MS in the same manner as a conventional single hop system. Therefore, the base station needs not to assign CID of this MS in a hierarchical manner.

When the CID of a MS is not assigned in a hierarchical manner, the hierarchical assignment of CID ends at the last access station. There is no need to re-assign the CID for this MS when the BS reconfigure the routing information. For example, refer to FIG. 5, if the BS reconfigures to have MS2 connected to the RS L, the BS only have to update it record that the RS L with CID 36 is the last access RS for the MS2 with CID 278. Then the RS L can forward data to the MS2 as in a single-hop system.

Since a connection identifier such as CID used in IEEE 802.16 is unique per connection, a station may have multiple connections, which carry different traffic types and priorities, and corresponding connection identifiers. All of these connection identifiers may be assigned according to only one hierarchy. However more than one hierarchy may be used to create different routes between the base station and its child station. This results in having layers of CID hierarchies while each layer contains one method of routing data from the root node (the base station) and the end node (terminal station).

The following references provide background information generally related to the present invention and are hereby incorporated by reference: [1] IEEE Std 802.16, IEEE Standard for Local and metropolitan area networks, Part 16: Air Interface for Fixed Broadband Wireless Access Systems, 2004. [2] IEEE Std 802.16e, IEEE Standard for Local and metropolitan area networks, Part 16: Air Interface for Fixed and mobile Broadband Wireless Access System, 2005. [3] R. Penman, *Bridges, Routers, Switches, and Internetworking Protocols*, Interconnection Second Edition, Addison-Wesley Professional Computing Series, 1999.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A method for route maintenance in a wireless network having at least a base station, a relay station and a mobile station, comprising:
   identifying each connection between the base station and the relay station and between the base station and the mobile station with a connection identifier based on packets received by the base station;
   creating a cache including connection identifiers and routing information based on the identified connections;
   transmitting the cache to the relay station within a downlink packet transmission;
   receiving the packets at the relay station;
   detecting and forwarding the packets in accordance with the connection identifiers and routing information included in the cache;

setting at least one time-out associated with one of the connection identifiers when the cache is transmitted within the downlink packet transmission;
resetting the time-out based on receiving an uplink packet; and
deleting at least one connection identifier from the cache based on an expiration of the timeout associated with the at least one connection identifier.

2. The method of claim 1, wherein the cache is created by the base station.

3. The method of claim 1, further comprising:
re-setting the time-out when the base station receives an uplink transmission.

4. The method of claim 1, wherein the method comprises:
setting a first time-out associated with a first of the connection identifiers and a second time-out associated with a second of the connection identifiers when the cache is transmitted within the downlink packet transmission;
receiving a packet including the first connection identifier;
resetting the first time-out based on the received packet including the first connection identifier; and
deleting the second connection identifier from the cache based on an expiration the second time-out associated with the second connection identifier.

5. The method of claim 1, wherein the identifying, creating, transmitting, setting, resetting and deleting are performed by the base station.

6. A system for route maintenance in a wireless network having at least a base station and a relay station, the system comprising:
a processor; and
a memory in communication with the processor, the memory including program code executable by the processor to perform the following:
identifying each connection between the base station and the relay station and between the base station and a mobile station with a connection identifier based on packets received by the base station;
creating a cache including connection identifiers and routing information;
transmitting the cache to the relay station within a downlink packet transmission;
receiving the packets at the relay station;
detecting and forwarding the packets in accordance with the connection identifiers and routing information included in the cache;
setting a time-out when the cache is transmitted within the downlink packet transmission;
resetting the time-out based on receiving an uplink packet; and
deleting at least one connection identifier from the cache based on an expiration of the timeout associated with the at least one connection identifier.

7. The system of claim 6, wherein the cache is created by the base station.

8. The system of claim 6, further configured to:
delete a content of the cache after the time-out expires.

9. The system of claim 6, wherein the cache is created based on connection identifiers received from at least the relay station and a mobile station.

10. An apparatus comprising:
a processor; and
a memory in communication with the processor, the memory including program code executable by the processor to cause route maintenance in a base station of a wireless network to perform the following:
identify each connection between the base station and a relay station and between the base station and a mobile station with a connection identifier based on packets received by the base station;
create a cache including connection identifiers and routing information;
transmit the cache to the relay station within a downlink packet transmission;
set a time-out when the cache is transmitted within the downlink packet transmission;
reset the time-out based on receiving an uplink packet; and
delete at least one connection identifier from the cache based on the time-out expiring.

11. The apparatus of claim 10, further configured to:
re-set the time-out when the base station receives an uplink transmission.

12. The apparatus of claim 10, wherein the cache is created based on connection identifiers received from at least the relay station and the mobile station.

13. A non-transitory computer-readable medium comprising computer executable code stored thereon that, when executed by a processor, is configured to cause route maintenance in a base station of a wireless network to:
identify each connection between the base station and a relay station and between the base station and a mobile station with a connection identifier based on packets received by the base station;
create a cache including connection identifiers and routing information;
transmit the cache to the relay station within a downlink packet transmission;
set a time-out when the cache is transmitted within the downlink packet transmission;
reset the time-out based on receiving an uplink packet; and
delete at least one connection identifier from the cache based on an expiration the timeout associated with the at least one connection identifier.

14. The non-transitory computer-readable medium of claim 13, further configured to cause the base station to:
re-set the time-out when the base station receives an uplink transmission.

15. The non-transitory computer-readable medium of claim 13, further configured to cause the base station to:
delete a content of the cache after the time-out expires.

16. The non-transitory computer-readable medium of claim 13, wherein the cache is created based on connection identifiers received from at least the relay station and the mobile station.

17. The non-transitory computer-readable medium of claim 13, wherein the code is further configured to cause the base station to:
reset the time-out based on receiving and uplink packet; and
delete at least one connection identifier from the cache based on the time-out expiring.

* * * * *